United States Patent [19]

Burk et al.

[11] 3,934,899
[45] Jan. 27, 1976

[54] FASTENING ARRANGEMENT OF ONE SHEET-METAL MEMBER PROVIDED WITH A RIM IN ANOTHER SHEET-METAL MEMBER ALSO PROVIDED WITH A RIM

[75] Inventors: Gerhard Burk, Magstadt; Dieter Willem, Sindelfingen, both of Germany

[73] Assignee: Daimler-Benz Aktiengesellschaft, Germany

[22] Filed: Oct. 16, 1974

[21] Appl. No.: 515,339

[30] Foreign Application Priority Data
Oct. 17, 1973    Germany............................ 2352181

[52] U.S. Cl............. 280/152 R; 52/758 D; 403/408
[51] Int. Cl.² .......................................... B62B 9/16
[58] Field of Search..... 280/152 R, 153 R; 403/408; 52/758 D, 758 F

[56] References Cited
UNITED STATES PATENTS
2,407,112    9/1946    Trautuetter....................... 296/28 R
2,634,138    4/1953    Zabel............................... 280/153 R
2,654,617    10/1953    Anschuetz....................... 280/153 R
3,093,392    6/1963    Barengi............................ 280/152 R
3,869,219    3/1975    Wilson............................. 403/408

FOREIGN PATENTS OR APPLICATIONS
4,611,366    3/1971    Japan............................... 403/408

*Primary Examiner*—Robert R. Song
*Attorney, Agent, or Firm*—Craig & Antonelli

[57] ABSTRACT

A fastening arrangement of one sheet metal member at another sheet metal member, especially of a fender at a motor vehicle body, in which embossments are arranged at the edge of one of the sheet metal members which keep the two edges at a distance from one another while the fastening is undertaken within the area of these embossments, for example, by threaded connections or welding.

26 Claims, 4 Drawing Figures

FASTENING ARRANGEMENT OF ONE SHEET-METAL MEMBER PROVIDED WITH A RIM IN ANOTHER SHEET-METAL MEMBER ALSO PROVIDED WITH A RIM

The present invention relates to a fastening of a sheet metal member provided with a rim at another sheet metal member also provided with a rim, especially to the fastening of a fender at a motor vehicle body.

In order to achieve, especially with fenders a completely satisfactory connection of the fender at the body, the assembly is carried out in the raw or unfinished condition, whereby intermediate layers or inserts are provided as a rule at the connecting surfaces, for example, expanded rubber, synthetic plastic strips, permanently plastic bands and the like, in order that the connecting surfaces which later on are not covered with paint during the painting operation, remain protected against corrosion damages. It has now been discovered that the arrangement of intermediate layers or inserts does not suffice in order to preclude with certainty corrosion damages, caused by the use of un-thawing salts on the roads. The present invention is therefore concerned with the task to aim at a fastening arrangement in which the use of intermediate layers or inserts is dispensed with, yet a safe corrosion protection is achieved nonetheless.

The underlying problems are solved in accordance with the present invention in that embossments in the form of beads, corrugations or nodular projections keeping the two rims or edges at a distance are provided at the rim or edge of the one or of the other sheet metal part and the fastening is realized within the area of these embossments, for example, by a threaded connection or by welded connections. It is achieved thereby in an advantageous manner that the surfaces previously inaccessible for the application of paint, are now covered with paint during the painting process with the exception of very few point-shaped or line-shaped places and are protected in this manner completely satisfactorily against corrosion.

With a fender in a motor vehicle, which is fastened with a rim thereof by means of bolts or screws at a rim of the body part laterally delimiting the engine space within the area of the wheel which body part will be referred to hereinafter for the sake of convenience as lateral sheet-metal wheel assembly body member, the embossments may be arranged according to another feature of the present invention at the rim or edge of the fender circumferentially about the screw-receiving holes or openings and may be disposed in a recess extending along the edge. The gap which results from the embossments between the lateral sheet metal wheel assembly body member and the fender is then no longer visible through the gap between the engine hood and the fender. For the same purpose the height of the embossments may be smaller than the recesses and dish-like or plate-like recesses may be provided along the edge or rim of the lateral sheet-metal wheel-assembly body member about the screw-receiving openings, which recesses abut at the embossments.

In one advantageous embodiment of the subject matter of the present invention, apertures may be provided at the edge of the lateral sheet metal wheel assembly body member intermediate the plate-like recesses so that an application with paint is still further facilitated. It is also favorable as regards the painting if, according to a further feature of the present invention, the edge of the lateral sheet-metal wheel assembly body member is cut back or reduced in its width between the plate-like recesses.

Within the area of the screw holes, three projecting studs or knobs each may be provided as embossments at the edge of the fender whose terminations pass over directly into the screw hole for purposes of reinforcing the rounded-off area in the sheet-metal part around the hole or opening receiving the respective threaded screw or bolt.

In order that a high tightening moment is attained in connection with threaded fastening, each screw-receiving hole or opening may be provided in the edge of the fender with a punched-through border forming a cylindrical extension.

Accordingly, it is an object of the present invention to provide a fastening of one sheet metal member at another sheet metal member which avoids by simple means the aforementioned shortcomings and drawbacks encountered in the prior art.

Another object of the present invention resides in a fastening arrangement for two sheet metal members provided with edge portions which far-reachingly prevents corrosion damages.

A further object of the present invention resides in a fastening of a fender at a body which permits dispensing with inserts or intermediate layers between the fender and the body, yet ensures a reliable and safe protection against all corrosion damages.

Still a further object of the present invention resides in a fastening arrangement for two sheet metal members, especially of a fender at the body of a motor vehicle, in which the areas hitherto inaccessible for purposes of application of paint, can be covered with paint during the painting process except for possible point- or line-shaped places, thereby greatly increasing the protection against corrosion.

A still further object of the present invention resides in a fastening arrangement of the type described above which not only improves the aesthetic appearance by eliminating the visibility of gaps, but additionally is simple in construction and provides adequate reinforcements to enable the achievement of sufficient tightening moments for the mutual fastening of the two parts by means of threaded connections.

These and further objects, features and advantages of the present invention will become more apparent from the following description when taken in connection with the accompanying drawing which shows, for purposes of illustration only two embodiments in accordance with the present invention, and wherein.

Figure 1:
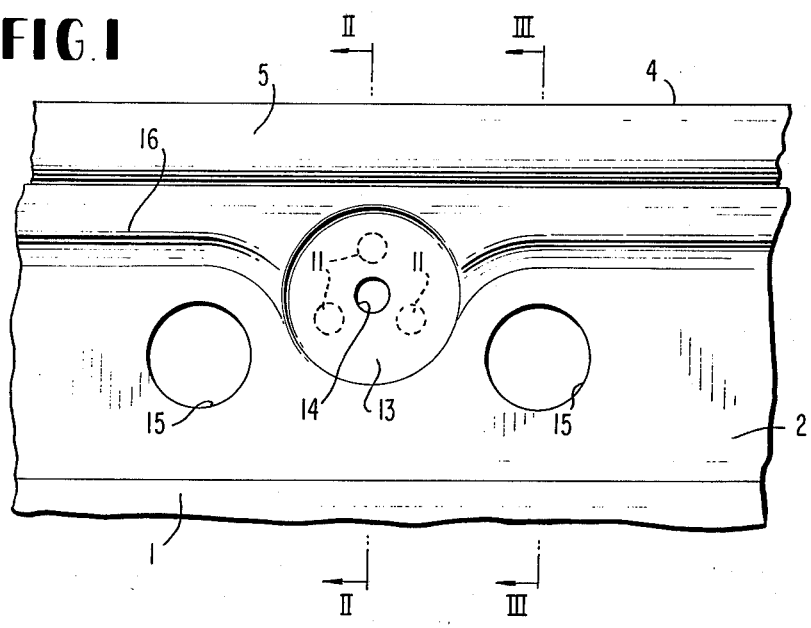
FIG. 1 is an elevational view of the fastening arrangement of a fender at a lateral wheel assembly body member in accordance with the present invention.
Figure 2:
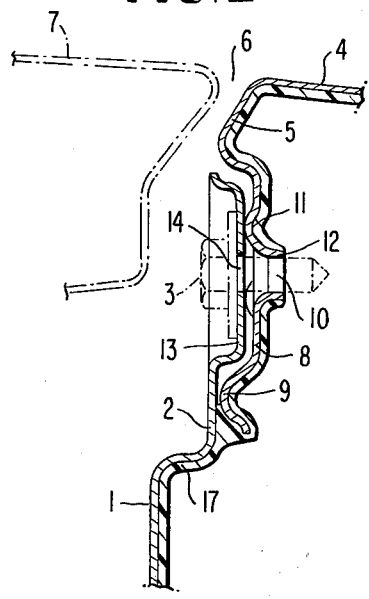
FIG. 2 is a partial cross-sectional view through the fastening arrangement of the present invention, taken along line II—II of FIG. 1.
Figure 3:
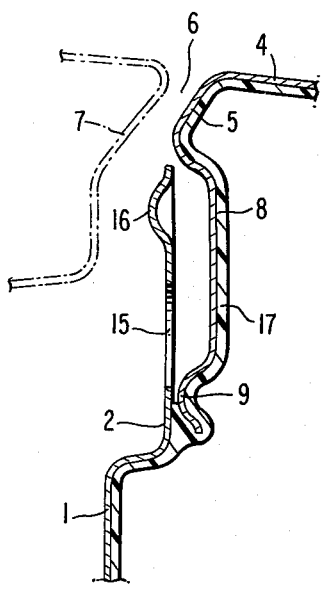
FIG. 3 is a partial cross-sectional view through the fastening arrangement according to the present invention, taken along line III—III of FIG. 1.

Referring now to the drawing wherein like reference numerals are used throughout the various views to designate like parts, and more particularly to FIGS. 1 to 3, reference numeral 1 designates in these figures a lateral wheel assembly body member of sheet-metal having a rim or edge 2, which is provided at a motor vehicle body. A front fender 4 is secured with its rim or edge 5 at the lateral wheel assembly body member 1 by means of bolts or screws 3, particularly by means of self-tapping screws of conventional type which have a thread cutting external configuration.

In order to achieve that the mutually facing surfaces of the rims or edges 2 and 5 can be covered with paint during the painting of the body, preferably in the course of the dipping process, the fastening arrangement is so constructed that the edge or rim 5 of the fender 4, except for a few point-shaped or line-shaped places is disposed at a distance to the edge or rim 2 of the lateral wheel assembly body member 1; however, this is done in such a manner that the gap between the two rims 2 and 5 cannot be seen through the gap 6 between the fender and the engine hood 7.

The rim or edge 5 of the fender 4 is provided, as can be seen in particular from FIG. 3, with a band-shaped recess 8 extending in the longitudinal direction of the rim, from which results a bead or corrugation 9 at the lower free end of the edge. At the places of the threaded connection, screw-receiving holes 10 (FIG. 2) are provided according to FIG. 2 within the recess 8 of the rim 5 into which the threads will be cut by the self-tapping screws 3. Three lug or pin-like embossments 11 (FIGS. 1 and 2) are provided about each hole or opening 10, whose terminations on the side of opening or hole 10 pass over directly into the walls of the opening or hole 10 for purposes of reinforcement of the latter, whereby the hole 10 terminates with a punched-through border 12 forming a cylindrical throat-like extension. The height of the embossments 11 is smaller than the depth of the recess 8.

According to FIG. 3, the rim or edge 2 of the sheet-metal wheel assembly body member 1 is disposed parallel to the rim or edge 5 of the fender 4 whereby a slight distance is present between the rim 2 and the corrugation or bead 9. Opposite the screw holes or openings 10 (FIG. 2), the rim or edge 2 is provided with plate-like or dish-like recesses 13 provided with holes or openings 14 and the edge or rim 5 of the fender 4 abuts with its embossments 11 at this recess 13.

As shown in FIGS. 1 and 3, the rim 2 of the lateral sheet metal wheel assembly body member 1 is provided with apertures 15 intermediate the plate-like recesses 13. Projecting corrugations or beads 16 are provided within the area of the edge terminal portion which project in the direction toward the vehicle body center.

Figure 4:
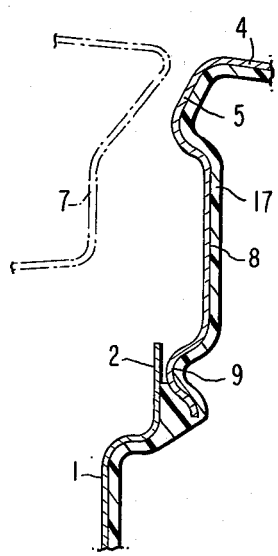
FIG. 4 is a cross-sectional view, corresponding to FIG. 3, through a modified embodiment of a fastening arrangement in accordance with the present invention, with a modified edge construction at the lateral sheet metal wheel assembly body member.

Possibly, the rim or edge 2 at the lateral sheet-metal wheel assembly body member 1 may be cut back according to FIG. 4 so far between the plate-like recesses 13 that the recess 8 in the rim or edge 5 of the fender 4 is completely accessible at these places.

The gap between the rim 2 of the lateral wheel assembly body member 1 and the corrugation 9 at the rim 5 of the fender 4 may be completely closed off by a coating 17, for example, consisting of a conventional synthetic resinous material or of a bituminous compound, which can be seen from FIG. 3, and which is applied to the wheel assembly body member 1 and the fender 4. However, it is also possible to provide a complementary corrosion protection between the two rims 2 and 5, for example, in the form of wax compounds of conventional type.

While we have shown and described two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A fastening arrangement of a sheet metal member provided with rim means at another sheet metal member also provided with rim means, characterized in that embossment means are arranged at the rim means of one of said sheet metal members which keep the two sheet metal members at a distance from one another, the two sheet metal members being fastened together within the area of said embossment means.

2. A fastening arrangement according to claim 1, characterized in that the embossment means are in the form of corrugations.

3. A fastening arrangement according to claim 1, characterized in that the embossment means are in the form of beads.

4. A fastening arrangement according to claim 1, characterized in that the embossment means are of stud-like shape.

5. A fastening arrangement according to claim 1, characterized in that the two sheet-metal members are fastened together by threaded means.

6. A fastening arrangement according to claim 1, characterized in that the two sheet metal members are fastened together by welded connections.

7. A fastening arrangement according to claim 1, characterized in that one sheet metal member is a fender which is secured at a motor vehicle body forming the other sheet metal member.

8. A fastening according to claim 1, with a fender in a motor vehicle forming one sheet metal member which is fastened by threaded members with a rim portion thereof at a rim portion of a lateral wheel assembly body member forming the other sheet metal member, characterized in that the embossment means are arranged about aperture means for receiving the threaded members and are disposed in a recess extending longitudinally of the corresponding rim portion.

9. A fastening arrangement according to claim 8, characterized in that the recess is provided in the fender.

10. A fastening arrangement according to claim 8, characterized in that the height of the embossment means is smaller than the depth of the recess.

11. A fastening arrangement according to claim 10, characterized in that plate-like recesses are provided at the rim portion of the lateral body member about openings, said recesses abutting at the embossment means.

12. A fastening arrangement according to claim 11, characterized in that apertures are provided in the rim portion of the lateral body member between the plate-like recesses.

13. A fastening arrangement according to claim 12, characterized in that the rim portion of the lateral body member is cut back in its width intermediate the plate-like recesses.

14. A fastening arrangement according to claim 13, characterized in that three projecting members are provided as embossment means within the area of the aperture means in the rim portion of the fender whose terminations on the side of the aperture means pass over directly into the respective aperture means.

15. A fastening arrangement according to claim 14, characterized in that each aperture means terminates with a punched-through border forming a cylindrical extension.

16. A fastening arrangement according to claim 15, characterized in that the gap between the rim means of the one sheet metal member and the rim means of the other sheet metal member is sealed off.

17. A fastening arrangement according to claim 16, characterized in that the gap is sealed off by synthetic resinous masses.

18. A fastening arrangement according to claim 16, characterized in that the gap is sealed off by bituminous compound masses.

19. A fastening arrangement according to claim 8, characterized in that plate-like recesses are provided at the rim portion of the lateral body member about aperture means, said recesses abutting at the embossment means.

20. A fastening arrangement according to claim 19, characterized in that the rim portion of the lateral body member is cut back in its width intermediate the plate-like recesses.

21. A fastening arrangement according to claim 8, characterized in that apertures are provided in the rim portion of the lateral body member between the plate-like recesses.

22. A fastening arrangement according to claim 8, characterized in that three projecting members are provided as embossment means within the area of the aperture means in the rim portion of the fender whose terminations on the side of the aperture means pass over directly into the respective aperture means.

23. A fastening arrangement according to claim 8, characterized in that each aperture means terminates with a punched-through border forming a substantially cylindrical extension.

24. A fastening arrangement according to claim 1, characterized in that the gap between the rim means of the one sheet metal member and the rim means of the other sheet metal member is sealed off.

25. A fastening arrangement according to claim 24, characterized in that the gap is sealed off by synthetic resinous masses.

26. A fastening arrangement according to claim 24, characterized in that the gap is sealed off by bituminous compound masses.

* * * * *